(12) United States Patent
Petrocelli

(10) Patent No.: US 8,090,924 B2
(45) Date of Patent: Jan. 3, 2012

(54) METHOD FOR THE ALLOCATION OF DATA ON PHYSICAL MEDIA BY A FILE SYSTEM WHICH OPTIMIZES POWER CONSUMPTION

(75) Inventor: Robert R. Petrocelli, Westerly, RI (US)

(73) Assignee: Greenbytes, Inc. a Rhode Island corporation, Ashaway, RI (US)

( * ) Notice: Subject to any disclaimer, the term of this patent is extended or adjusted under 35 U.S.C. 154(b) by 468 days.

(21) Appl. No.: 12/402,294

(22) Filed: Mar. 11, 2009

(65) Prior Publication Data

US 2009/0235042 A1    Sep. 17, 2009

Related U.S. Application Data

(60) Provisional application No. 61/036,251, filed on Mar. 13, 2008.

(51) Int. Cl.
*G06F 13/00* (2006.01)
(52) U.S. Cl. .......................... 711/170; 711/154
(58) Field of Classification Search .................. 711/154, 711/170
See application file for complete search history.

(56) References Cited

U.S. PATENT DOCUMENTS

2007/0271413 A1 * 11/2007 Fujibayashi et al. .......... 711/112

* cited by examiner

*Primary Examiner* — Reba I. Elmore
(74) *Attorney, Agent, or Firm* — Barlow, Josephs & Holmes, Ltd.

(57) ABSTRACT

The present invention provides a method for the allocation of data on physical media by a file system which optimizes power consumption. The present invention improves power efficiency of computing devices using file systems by allocating data in a way that allows devices to power down when they are not in use. This is carried out by using an allocation group method to divide the storage system into groups of one or more disk drives. The allocator fills the first group entirely before moving to the second group. The allocator globally allocates blocks within each group. Groups are typically sized to meet the average I/O bandwidth requirement of the application. The method also dynamically increases the number of active allocation groups based on I/O load. This is done by computing the average number of write requests per time period.

6 Claims, 1 Drawing Sheet

METHOD FOR THE ALLOCATION OF DATA ON PHYSICAL MEDIA BY A FILE SYSTEM WHICH OPTIMIZES POWER CONSUMPTION

CROSS REFERENCE TO RELATED APPLICATION

This application is related to and claims priority from earlier filed provisional patent application Ser. No. 61/036,251 filed Mar. 13, 2008, the entire contents thereof is incorporated herein by reference.

BACKGROUND OF THE INVENTION

The present invention relates generally to a method for the allocation of data on physical media by a file system which optimizes power consumption.

The operation of computers are very well known in the art. Such a file system exists on a computer or across multiple computers, where each computer typically includes data storage, such as a hard disk or disk(s), random access memory (RAM) and an operating system for executing software code. Software code is typically executed to carry out the purpose of the computer. As part of the execution of the computer code, storage space on the hard disk or disks and RAM are commonly used. Also, data can be stored, either permanently or temporarily on the hard disk or disks and in RAM. The structure and operation of computers are so well known in the art that they need not be discussed in further detail herein.

In the field of computers and computing, file systems are also very well known in the art to enable the storage of such data as part of the use of the computer. A computer file system is a method for storing and organizing computer files and the data they contain to make it easy to find and access them. File systems may use data storage devices such as a hard disks or CD-ROMs and involve maintaining the physical location of the files, and they might provide access to data by the computer operating system or on a file server by acting as clients for a network protocol (e.g., NFS, SMB, or 9P clients). Also, they may be virtual and exist only as an access method for virtual data.

More formally, a file system is a special-purpose database for the storage, organization, manipulation, and retrieval of data. This database or table which centralizes the information about which areas belong to files, are free or possibly unusable, and where each file is stored on the disk. To limit the size of the table, disk space is allocated to files in contiguous groups of hardware sectors called clusters. As disk drives have evolved, the maximum number of clusters has dramatically increased, and so the number of bits used to identify each cluster has grown. For example, FAT, and the successive major versions thereof are named after the number of table element bits: 12, 16, and 32. The FAT standard has also been expanded in other ways while preserving backward compatibility with existing software.

File systems are specialized databases which manage information on digital storage media such as magnetic hard drives. Data is organized using an abstraction called a file which consists of related data and information about that data (here after referred to as metadata). Metadata commonly consists of information like date of creation, file type, owner, etc.

The file system provides a name space (or a system) for the unique naming of files. File systems also frequently provide a directory or folder abstraction so that files can be organized in a hierarchical fashion. The abstraction notion of file and folders does not represent the actual physical organization of data on the hard disk only its logical relationships.

Hard disks consist of a contiguous linear array of units of storage referred to as blocks. Blocks are all typically the same size and each has a unique address used by the disk controller to access the contents of the block for reading or writing. File systems translate their logical organization into the physical layer by designating certain address as special or reserved. These blocks, often referred to as super-blocks, contain important information about the file system such as file system version, amount of free space, etc. They also contain or point to other blocks that contain structures which describe directory and file objects.

One of the most important activities performed by the file system is the allocation of these physical blocks to file and directory objects. The algorithm employed to make these decisions is commonly called the allocator, which are implemented in computer code that runs on a computer. The present invention relates specifically to the method used by a computer for the allocator to determine how, where and when to write the new data to free blocks on the physical media within a computer environment.

In the prior art, various types of algorithms are employed. For example, it is well known to use a global allocator algorithm when only one disk is available, such as a single hard disk. In this case, the allocator selects the next free block from the list of free-blocks maintained by the file system. This global allocation system and algorithm works well for storage systems that includes only one single physical disk.

However, today's computer systems, such as servers and data centers, commonly have hundreds or even thousands of physical hard disks for storage that are written to. However, since large storage systems contain more than one physical disk, the decision as to which block to allocate become more complex. In these environments, it is common for file systems to attempt to spread file data out uniformly across all available disks. This is done to optimize performance and to balance the input/output (I/O) load across all devices. While this simple strategy provides a globally optimized system from the standpoint of I/O load, it can cause significant difficulty in power managed storage systems which attempt to reduce power consumption via the deactivation of idle disks. Therefore, known algorithms and allocators are not particularly well suited for these large arrays of disks.

In the prior art, there have been various attempts to address the aforementioned shortcomings in known algorithms and allocators by providing a system that better handles the competing interests of optimizing performance and load with the reduction of power consumption to provide a "greener" overall system.

One such attempt in the prior art is the important trend of providing a "power managed system" that improves the power efficiency of computing devices thereby reducing their indirect emission of greenhouse gasses. One way to do this is to power down the devices when they are not in use. While this appears feasible in theory, it is very difficult if not impossible to carry out in practice, particularly with storage systems because all mainstream file systems employ some type of global allocator which forces all disk drives to become active when ever data is written. Since data is commonly written across many drives, as above, those drives must all be active to enable data to be written to them. Despite this low utilization of a storage devices, I/O bandwidth can still force all drives in the system to become active, thereby defeating the power management of the prior art.

For example, such prior art systems can include a massive array of idle disks, more commonly known as a MAID. A MAID is a system using hundreds to thousands of hard drives for near-line data storage. MAID is typically designed for Write Once, Read Occasionally (WORO) applications. In a MAID each drive is only spun up on demand as needed to access the data stored on that drive. This is not unlike a very large JBOD but with power management.

Compared to a Redundant Array of Independent Disks (RAID) technology, a MAID has increased storage density, and decreased cost, electrical power, and cooling requirements. However, these advantages are at the cost of much increased latency, significantly lower throughput, and decreased redundancy. Most large hard drives are designed for near-continuous spinning; their reliability will suffer if spun up repeatedly to save power.

With the advent of SATA disk drives that are designed to be powered on and off, MAID architecture has evolved into a new storage platform for long term, online storage of persistent data. Large scale disk storage systems based on MAID architectures allow dense packaging of drives and are designed to have only 25% of disks spinning at any one time.

There are many advantages to MAID. These include the ability to avoid 80% of the stored data from being accessed for long period of time which is conducive to large arrays, such as data centers with 2000 drives, or more. Another advantage is 30 KW total power consumption with a total annual drive power consumption of 263,000 KWH which can potentially save about 210,000 KWH per year in this example. Also, MAID is easily scalable up and down.

However, there are a number of shortcomings of a MAID. Such file systems generally expect all drives under management to be spinning. This is exacerbated in modern file systems that spread their data across drives forcing them into a high power state even under light I/O loads. This results in pathological power thrashing, premature drive failure, poor performance and dissatisfied users.

In view of the foregoing, there is a need to provide a method of allocating data on physical media of a computer, such as one with a MAID, that is optimized for a MAID There is a need for a method of allocating that optimizes power consumption, particularly on a MAID.

There is also a need for a file system that dynamically changes according to the I/O of the computer.

There is a further need to provide a method of allocating data on physical media of a computer that enables devices that are not in use to successfully power down to improve power efficiency.

Yet another need is to provide a method of allocating data on physical media of a computer that results in a "greener" device than prior art devices.

There is another need to provide a method of allocating data on physical media that optimizes MAID, even under normal file sharing loads.

SUMMARY OF THE INVENTION

The present invention preserves the advantages of prior art methods of allocating data on physical and devices and systems therefor. In addition, it provides new advantages not found in currently available method of allocating data and devices and systems therefor and overcomes many disadvantages of such currently available methods, devices and systems.

The present invention provides a method for the allocation of data on physical media by a file system which optimizes power consumption. The present invention improves power efficiency of computing devices using file systems, such as those in a MAID, by allocating data in a way that allows devices to power down when they are not in use. This is carried out by using an allocation group method to divide the storage system into groups of one or more disk drives. The allocator fills the first group entirely before moving to the second group. The allocator globally allocates blocks within each group. Groups are typically sized to meet the average I/O bandwidth requirement of the application. The method also dynamically increases the number of active allocation groups based on I/O load. This is done by computing the average number of write requests per time period.

The present invention provides a data allocation strategy that is MAID friendly and that requires a virtual pool and is adaptive to bandwidth concurrent I/O requirements. The present invention is also preferably implemented as an extension to the ZFS file system used for the Solaris Operating System designed by Sun Microsystems.

It is therefore an object of the present invention to provide a method for allocating data in a computer that is more power efficient than prior art methods.

Another object of the invention is to provide a system for allocating data in a computer that is more efficient that prior art systems.

Another object of the invention is to provide a method of allocating data on physical media that dynamically divides the storage system into groups.

A further object of the invention is to provide a method of allocating data on physical media that dynamically sizes allocation groups based on I/O load.

Yet another object of the present invention is to provide a method of allocating data on physical media that optimizes the storage of data on a MAID.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

As seen in the attached drawing figures, details of the preferred embodiment of the device 10 of the present invention are shown.

The present invention provides a method for the allocation of data on physical media by a file system which optimizes power consumption. The present invention improves power efficiency of computing devices using file systems, such as those in a MAID, by allocating data in a way that allows devices to power down when they are not in use.

The present invention is carried out by using an allocation group method to divide the storage system into groups of one or more disk drives rather than spreading all of the data across all drives in the array. The allocator fills the first group entirely before moving to the second group. The allocator globally allocates blocks within each group. As discussed in detail below, groups are preferably sized to meet the average I/O bandwidth requirement of the application at hand. The method of the present invention also dynamically increases the number of active allocation groups based on I/O load. This is done by computing the average number of write requests per time period. Details of this method of the present invention is set forth below.

The present invention provides a data allocation strategy that is MAID friendly and that requires a virtual pool and is adaptive to bandwidth concurrent I/O requirements. The present invention is also preferably implemented as an extension to the ZFS file system used for the Solaris Operating System designed by Sun Microsystems. However, the method of the present invention may be easily modified for use with other operating systems.

With the present invention, energy consumption associated with data storage is reduced by up to 80 percent, enabling management of critical information more economically, effectively and ecologically than what is capable with prior art methods and systems.

The method of the present invention uses a new file operating system, called ZFS+, which represents one of the first proprietary products derived from Sun Microsystems' OpenSolaris™ operating system. ZFS+ is the only enterprise-scale file system that has fundamental properties of storage efficiency with real-time de-duplication, block-level compression and intelligent power management.

Figure 1:
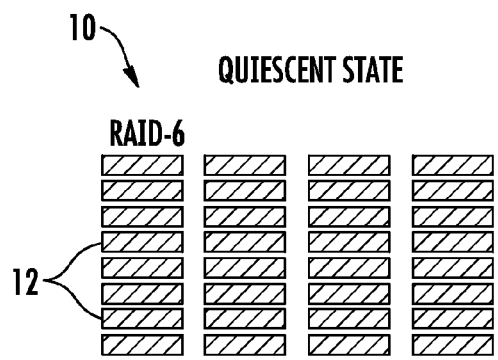
FIG. 1 is a diagram of an array of groups of drives in a quiescent state in accordance with the present invention.
Figure 2:
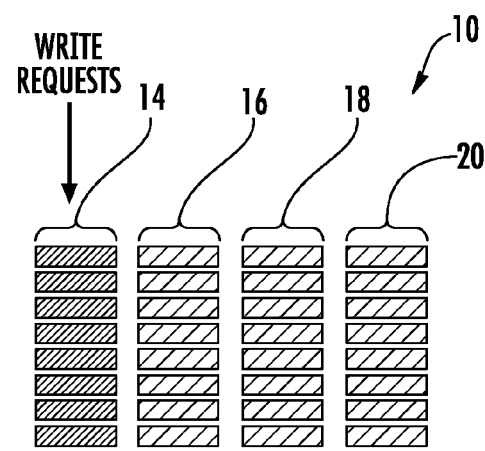
FIG. 2 is a diagram of an array of groups of drives with a load of less than 25% MAX IOPS in accordance with the present invention.
Figure 3:
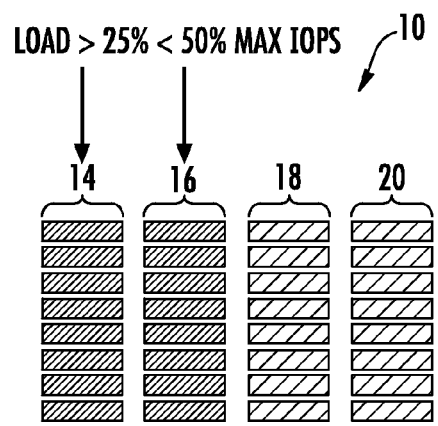
FIG. 3 is a diagram of an array of groups of drives with a load of >25%<50% MAX IOPS in accordance with the present invention.

Referring now to FIG. 1, the disk array 10 is shown in a quiescent or idle state where the storage devices 12 (e.g. disk drives) are completely inactive. FIG. 2 shows the disk array of the storage system divided by the allocator into groups 14, 16, 18, 20 of one or more disk drives. Four groups are shown by way of example only. More or less than four groups may be used. As in FIG. 2, the allocator fills the first group 14 of disk drives where the load is less than 25% of the maximum input/output operations per second (IOPS). Then, as the load increases into the range of 25-50% IOPS, the next group 16 of disk drives are being written to, as shown in FIG. 3.

Figure 4:
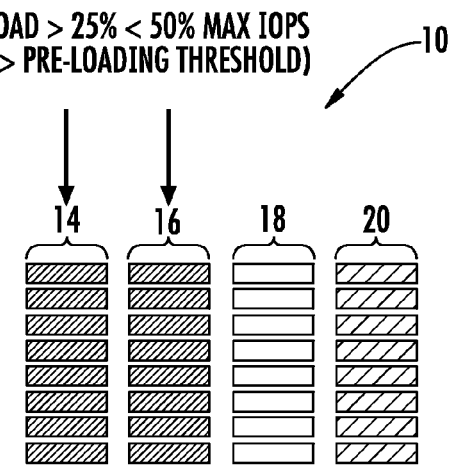
FIG. 4 is a diagram of an array of groups of drives with a load of >25%<50% MAX IOPS (>pre-loading threshold) in accordance with the present invention.

FIG. 4 shows an example where the first two groups 14, 26 of disk drives are shown being written to, while the third group 18 of drives are shown being spun up in anticipation of data being written to them. In this case, the I/O load is shown increasing to a point past a "pre-loading threshold" where it is expected shortly that disk group 18 will be written to. Spinning up drives in advance of the exact time when data needs to be written to the drives improves performance. In the FIG. 4, the fourth group 20 remains idle. The allocator globally allocates blocks within each group 14, 16, 18 and 20.

An important facet of the method of the present invention is the ability to divide the storage system into groups of one or more disk drives. This is accomplished by dynamically increases the number of active allocation groups based on I/O load. In accordance with the present invention, the average number of write requests are computed for a given time period. The time period is adjustable and based on the granularity of load adjustment response required by the application.

Also, the size of the allocation groups (e.g. 14, 16, 18, 20) are sized to meet the average I/O bandwidth requirement of the application. Since the number of IOPS (input/output operations per second) can be directly measured by the file system, a number of calculations can be made to determine the groups of drives and active allocation groups to carry out the present method.

The number of allocation groups (ags) to make active is defined as:

$$\text{Active(ag)}=\text{Sum(max(IOPS))}/\text{average(IOPS)}.$$

where the maximum (IOPS)=maximum sustains IOPS/disk that can be measured as an intrinsic characteristic of the disk drive subsystem and the average(IOPS)=Sum(IOPS)/load-adjustment-period.

Once the number of active allocation groups are determined using the above calculation and data that is readily available directly from the file system, the storage system can be divided up into groups of one or more disk drives. Groups of drives that are not being written to, such groups 18 and 20 in FIG. 3, can be powered down effective to reduce overall power consumption of the array and, as a result, the system into which it is installed.

Therefore, the storage system 10 can be divided into the appropriate number of groups where the number of active allocation groups are dynamically increases based on I/O load. As a result, the groups of disks can be written separately so that inactive groups that are not being written to can remain inactive to achieve a reduction in overall power consumption of the array of disks.

It should be understood that the present invention may be employed in any type of operating system, although Solaris is preferred. Also, the method of the present invention has particular applicability in optimizing power consumption in arrays of magnetic hard disks. However, this method may also be employed in arrays of other types of storage devices, such as solid state (such as flash) and optical media.

It would be appreciated by those skilled in the art that various changes and modifications can be made to the illustrated embodiments without departing from the spirit of the present invention. All such modifications and changes are intended to be covered by the appended claims.

What is claimed is:

1. A method of allocating data on physical media to optimize power consumption thereof, comprising the steps of:
   providing an array of storage devices;
   assigning the array of storage devices into a number of active allocation groups of storage devices according to the following:

$$\text{Active(ag)}=\text{Sum(max(IOPS))}/\text{average(IOPS)}$$

where the maximum (IOPS) is the maximum sustains IOPS/storage device that can be measured as an intrinsic characteristic of the storage device subsystem and the average(IOPS)=Sum(IOPS)/load-adjustment-period; and
   writing data to the active allocation groups of storage devices.

2. The method of claim 1, wherein the storage devices are magnetic disk drives.

3. The method of claim 1, wherein the storage devices are solid state drives.

4. The method of claim 1, wherein storage devices that are not assigned into a number of active allocation groups are powered down.

5. The method of claim 1, wherein data is written to a first allocation group of storage devices to completely fill the first allocation group of storage devices before a second allocation group of storage devices are written to.

6. The method of claim 1, further comprising the step of:
   allocating blocks within each group of storage devices.

* * * * *